(12) United States Patent
Lan et al.

(10) Patent No.: US 12,379,961 B1
(45) Date of Patent: Aug. 5, 2025

(54) SERVICE INSTANCE SCHEDULING METHOD, AN ELECTRONIC DEVICE, AND A STORAGE MEDIUM

(71) Applicant: Beijing Zitiao Network Technology Co., Ltd., Beijing (CN)

(72) Inventors: Xinyu Lan, Beijing (CN); Ziang Ma, Beijing (CN); Chaoyang Li, Beijing (CN); Tieju Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/988,678

(22) Filed: Dec. 19, 2024

(30) Foreign Application Priority Data

Feb. 5, 2024 (CN) .................. 202410168211.X

(51) Int. Cl.
*G06F 9/46* (2006.01)
*G06F 9/48* (2006.01)
*G06F 11/34* (2006.01)
*H04L 9/06* (2006.01)

(52) U.S. Cl.
CPC ........ *G06F 9/4881* (2013.01); *G06F 11/3409* (2013.01); *H04L 9/0643* (2013.01)

(58) Field of Classification Search
CPC .................................................... G06F 9/4881
USPC ....................................................... 718/102
See application file for complete search history.

(56) References Cited

U.S. PATENT DOCUMENTS

| | | | |
|---|---|---|---|
| 10,637,952 B1 * | 4/2020 | Koenig | H04L 67/1031 |
| 10,936,291 B1 * | 3/2021 | Gamliel | G06F 8/72 |
| 11,561,868 B1 * | 1/2023 | Poornachandran | G06F 11/165 |
| 12,019,502 B2 * | 6/2024 | Mohanty | G06N 20/00 |
| 2005/0198335 A1 * | 9/2005 | Brown | H04L 67/1014 |
| | | | 709/229 |
| 2013/0346512 A1 * | 12/2013 | Thiel | G06F 9/5011 |
| | | | 709/206 |
| 2017/0104641 A1 * | 4/2017 | Bradshaw | G06T 1/20 |
| 2018/0241680 A1 * | 8/2018 | Larose | H04L 45/64 |
| 2019/0102717 A1 * | 4/2019 | Wu | H04L 41/147 |
| 2021/0311765 A1 * | 10/2021 | Subramanian | G06F 9/45558 |
| 2022/0078091 A1 * | 3/2022 | Qiu | H04L 41/5012 |
| 2022/0255823 A1 * | 8/2022 | Yousouf | H04L 67/10 |
| 2023/0105203 A1 * | 4/2023 | Reeve | G06F 16/27 |
| | | | 714/38.1 |
| 2023/0198863 A1 * | 6/2023 | Poornachandran | |
| | | | G06F 9/45558 |
| | | | 709/224 |

(Continued)

FOREIGN PATENT DOCUMENTS

CN 111698301 A 9/2020

*Primary Examiner* — Mehran Kamran
(74) *Attorney, Agent, or Firm* — BakerHostetler

(57) ABSTRACT

Embodiments of the present disclosure provide a service instance scheduling method and apparatus, an electronic device, and a storage medium. A microservice access data for a target service is obtained in a bypass mode based on a service mesh, where the microservice access data represents access records of at least two upstream services of the target service with respect to a service instance of the target service. An evaluation indicator of at least one service instance corresponding to the target service is obtained according to the microservice access data, where the evaluation indicator represents a health degree of the service instance. The service instance is fused according to the evaluation indicator of the service instance.

17 Claims, 10 Drawing Sheets

(56) References Cited

U.S. PATENT DOCUMENTS

| | | | |
|---|---|---|---|
| 2023/0205652 A1* | 6/2023 | Poornachandran | ........................... G06F 11/1641 714/11 |
| 2023/0259407 A1* | 8/2023 | Lang | ..................... G06F 9/5044 718/105 |
| 2023/0385143 A1* | 11/2023 | Mohanty | ............. G06F 11/0751 |
| 2024/0289158 A1* | 8/2024 | Singarayan | ......... H04L 61/3015 |
| 2024/0364724 A1* | 10/2024 | Behl | ................... H04L 63/1441 |

\* cited by examiner

SERVICE INSTANCE SCHEDULING METHOD, AN ELECTRONIC DEVICE, AND A STORAGE MEDIUM

CROSS-REFERENCE TO RELATED APPLICATION

This application claims the priority to and benefits of the Chinese Patent Application, No. 202410168211.X, which was filed on Feb. 5, 2024. The aforementioned patent application is hereby incorporated by reference in its entirety.

TECHNICAL FIELD

Embodiments of the present disclosure relate to the field of computer technology and, in particular, to a service instance scheduling method and apparatus, an electronic device, and a storage medium.

BACKGROUND

Microservice is an application development architecture and organization method. An application which is based on microservices consists of small independent services communicating based on well-defined interfaces. At present, distributed deployment is performed on a service, so that the service has high availability and scalability, thereby improving the performance of the program.

In an application scenario where distributed deployment is performed on a service, an individual service instance of the service may experience an invocation abnormality when invoked by an upstream service due to a load, a network, or other reasons. The service instance with the abnormality may be fused to improve the operation stability of the upstream service.

However, in the solutions in the prior art, there is a problem that the overall performance of a service is caused to decline due to unreasonable fusion scheduling of a service instance.

SUMMARY

Embodiments of the present disclosure provide a service instance scheduling method and apparatus, an electronic device, and a storage medium, to overcome the problem of the overall performance decline of a service caused by unreasonable fusion of a service instance.

In a first aspect, an embodiment of the present disclosure provides a service instance scheduling method, including:
  obtaining, based on a service mesh, microservice access data for a target service in a bypass mode, where the microservice access data represents access records of at least two upstream services of the target service with respect to a service instance of the target service; obtaining an evaluation indicator of at least one service instance corresponding to the target service according to the microservice access data, where the evaluation indicator represents a health degree of the service instance; and fusing the service instance according to the evaluation indicator of the service instance.

In a second aspect, an embodiment of the present disclosure provides a service instance scheduling apparatus, including:
  an obtaining module, configured to obtain, based on a service mesh, microservice access data for a target service in a bypass mode, where the microservice access data represents access records of at least two upstream services of the target service with respect to a service instance of the target service;
  a processing module, configured to obtain an evaluation indicator of at least one service instance corresponding to the target service according to the microservice access data, where the evaluation indicator represents a health degree of the service instance; and
  a scheduling module, configured to fuse the service instance according to the evaluation indicator of the service instance.

In a third aspect, an embodiment of the present disclosure provides an electronic device, including: a processor and a memory;
  where the memory stores computer execution instructions; and
  the processor executes the computer execution instructions stored in the memory, to cause the processor to perform the service instance scheduling method according to the first aspect and various possible designs of the first aspect.

In a fourth aspect, an embodiment of the present disclosure provides a computer-readable storage medium, where the computer-readable storage medium stores computer execution instructions, and when the processor executes the computer execution instructions, the service instance scheduling method according to the first aspect and various possible designs of the first aspect is implemented.

In a fifth aspect, an embodiment of the present disclosure provides a computer program product, including a computer program, where when the computer program is executed by a processor, the service instance scheduling method according to the first aspect and various possible designs of the first aspect is implemented.

BRIEF DESCRIPTION OF DRAWINGS

In order to illustrate the technical solutions in the embodiments of the present disclosure or in the prior art more clearly, the following briefly introduces the drawings required for describing the embodiments or the prior art. Apparently, the drawings in the following description show some embodiments of the present disclosure, and other drawings may also be obtained by a person of ordinary skill in the art according to these drawings without creative efforts.

DETAILED DESCRIPTION

In order to make the objectives, technical solutions, and advantages of embodiments of the present disclosure clearer, the following clearly and comprehensively describes the technical solutions in the embodiments of the present disclosure with reference to the drawings in the embodiments of the present disclosure. Apparently, the described embodiments are merely some rather than all embodiments of the present disclosure. All other embodiments obtained by a person of ordinary skill in the art based on the embodiments in the present disclosure without creative efforts shall fall within the protection scope of the present disclosure.

It should be noted that user information (including but not limited to user device information, user personal information, and the like) and data (including but not limited to data for analysis, stored data, displayed data, and the like) involved in the present disclosure are information and data authorized by a user or fully authorized by parties, and the collection, use, and processing of related data need to comply with relevant laws, regulations, and standards of relevant countries and regions, and are provided with corresponding operation entrances for the user to select authorization or refusal.

An application scenario of embodiments of the present disclosure is explained below.

Figure 1:
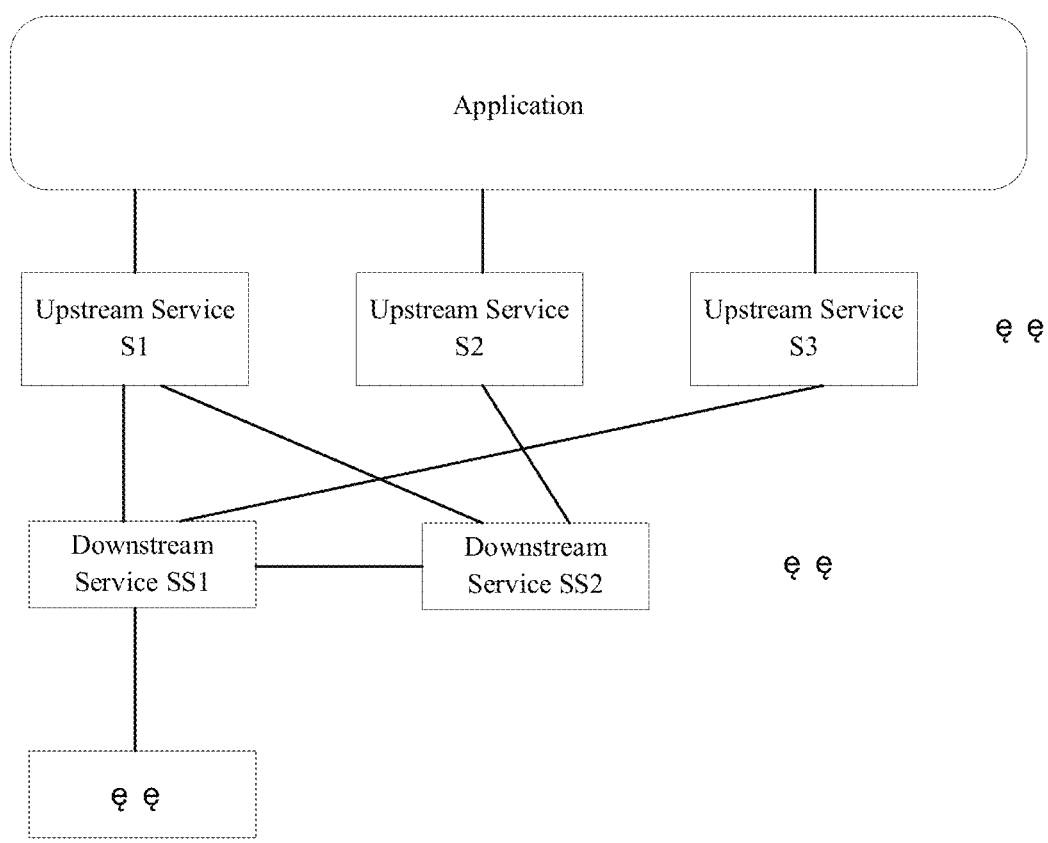
FIG. 1 is a schematic diagram of a structure of an application based on microservices according to an embodiment of the present disclosure.

FIG. 1 is a schematic diagram of a structure of an application based on microservices according to an embodiment of the present disclosure. As shown in FIG. 1, an application includes a plurality of function modules, each function module is implemented by a corresponding microservice (hereinafter referred to as a service), and the service may be used as an upstream service (for example, an upstream service S1, an upstream service S2, an upstream service S3, or the like shown in the figure) and its downstream service (for example, a downstream service SS1, a downstream service SS2, or the like shown in the figure) is further invoked to implement a more specific function. Data communication is performed between different services in a manner such as HyperText Transfer Protocol (HTTP), or the like. Each service creates a plurality of service instances in a corresponding service cluster, and an upstream service can invoke a service instance of a downstream service to implement a corresponding function call.

The service instance scheduling method provided in this embodiment may be applied to a scenario where an application program is deployed based on a service mesh. The service mesh is a containerized architecture and may be used for automatically processing discovery and connection of services. A service instance corresponding to a service may be deployed in a container. The method provided in the embodiments of the present disclosure may be executed by a data plane of the service mesh or a service instance scheduling apparatus (component) deployed in the service mesh system. Further, the apparatus may be implemented by software and/or hardware, and the apparatus may also be integrated into an electronic device (for example, a cloud server) with a specific data processing function. The electronic device may include, but is not limited to, a mobile terminal with a big data processing capability, and a fixed terminal with a big data processing capability, such as a desktop computer and a supercomputer.

In the prior art, in an application scenario where distributed deployment is performed on a service, an individual service instance of the service may experience an invocation abnormality when invoked by an upstream service due to a load, a network, or other reasons. The service instance with the abnormality may be fused to improve the operation stability of the upstream service. However, in a microservice scenario, an invocation between services is complex, and one service usually provides services for a plurality of upstream services. In the solutions in the prior art, an abnormality of a service instance of a downstream service is analyzed only in a certain client instance. Therefore, the solutions lack a global perspective, which results in the fusion being triggered when an error jitter of the service instance of the downstream service is detected, thereby causing the overall performance of the service to decline.

An embodiment of the present disclosure provides a service instance scheduling method to solve the above problem.

Figure 2:
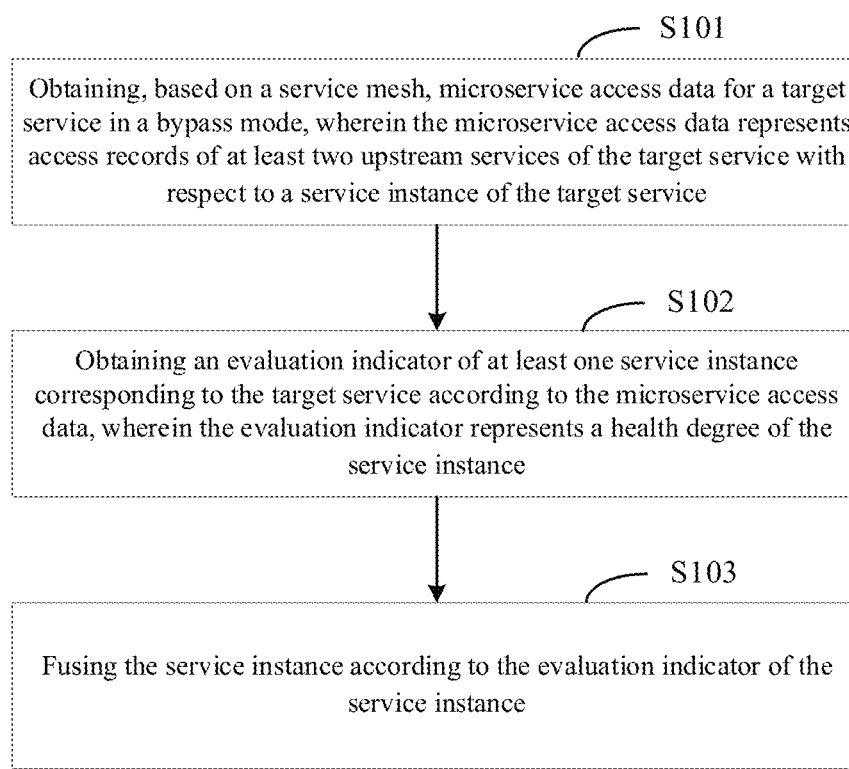
FIG. 2 is a first schematic flowchart of a service instance scheduling method according to an embodiment of the present disclosure.

FIG. 2 is a first schematic flowchart of a service instance scheduling method according to an embodiment of the present disclosure. The method in this embodiment may be applied to a cloud server, and the service instance scheduling method includes the steps below.

S101, obtaining, based on a service mesh, microservice access data for a target service in a bypass mode, wherein the microservice access data represents access records of at least two upstream services of the target service with respect to a service instance of the target service.

Exemplarily, based on the above introduction to the application scenario, the service mesh is a containerized architecture. The service mesh deploys a configurable proxy layer and services together, serves as a microservice infrastructure layer to take over traffic between services, and provides basic functions such as universal service registration and discovery, load balancing, identity verification, precise routing, and service authentication. The service mesh is combined with a platform such as Kubernetes for managing containers to implement application deployment. Further, a target service for implementing a function module of an application is taken as an example. The target service has at least one upstream service. The upstream service accesses a service instance corresponding to the target service located downstream to invoke a service function corresponding to the target service and generate a corresponding access record. The access record includes information such as an access time, an access content (that is, an input for the target service), and an access result (an output of the service).

After an application is deployed, the service mesh obtains, in a bypass (also referred to sidecar) mode, the access records of the at least two upstream services of the target service with respect to the service instance of the target service, that is, the microservice access data. In a preferred implementation, the microservice access data represents the access records of all upstream services of the target service with respect to the service instance of the target service. More specifically, the microservice access data includes a set of access records of all upstream services of the target service with respect to each service instance of the target service. The sidecar is equivalent to a locally deployed proxy server and is configured to take over entry traffic and exit traffic of a service. The bypass corresponds to a non-core function of the service. A mesh data plane of the service is integrated into the bypass, so that the function of collecting and transmitting log data, an indicator, and performance data corresponding to the service to the service instance scheduling component for real-time monitoring, troubleshooting, and performance analysis may be implemented.

Figure 3:
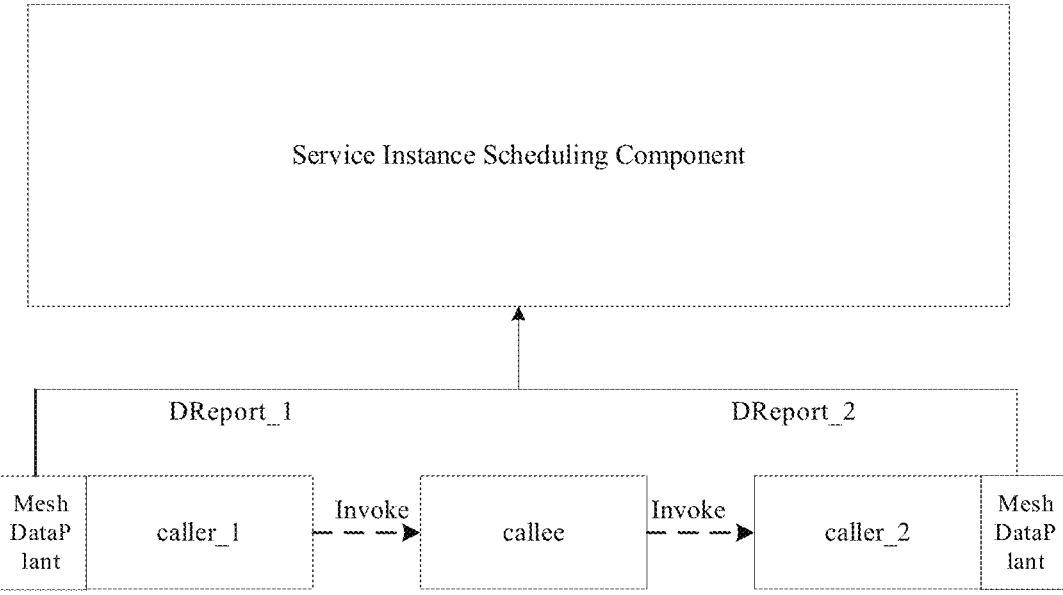
FIG. 3 is a schematic diagram of a bypass mode according to an embodiment of the present disclosure.

FIG. 3 is a schematic diagram of a bypass mode according to an embodiment of the present disclosure. As shown in FIG. 3, a caller_1 and a caller_2 in the figure are upstream services that invoke a target service callee. After the caller_1 and the caller_2 invoke a service instance in the callee, corresponding access records, for example, DReport_1 and DReport_2 shown in the figure, are generated. The mesh data plane integrated in the bypass of the caller_1 and the caller_2 is used for obtaining the above access records DReport_1 and DReport_2, and the access records DReport_1 and DReport_2 are sent to a service instance scheduling component. The service instance scheduling component obtains a set of the above access records DReport_1 and DReport_2, to obtain the microservice access data for the target service. The microservice access data may include a set of all access records (DReport_1 and DReport_2) for invoking a service instance of the target service callee.

Figure 4:
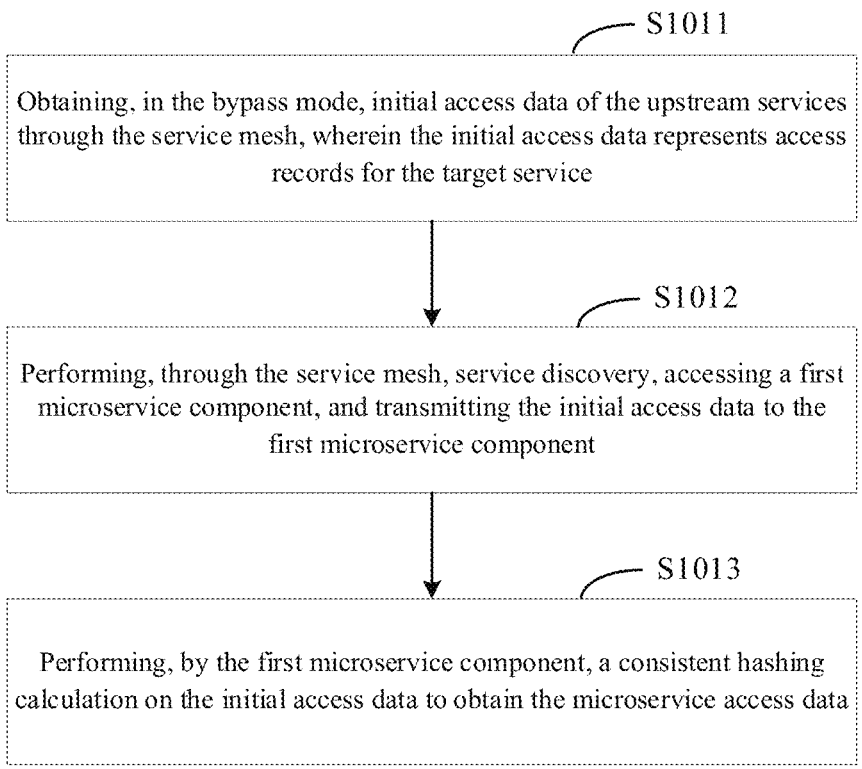
FIG. 4 is a flowchart of a specific implementation of step S101 in the embodiment shown in FIG. 2.

Further, in a possible implementation, as shown in FIG. 4, a possible implementation of step S101 includes the steps below.

S1011, obtaining, in the bypass mode, initial access data of the upstream services through the service mesh, wherein the initial access data represents access records for the target service.

S1012, performing, through the service mesh, service discovery, accessing a first microservice component, and transmitting the initial access data to the first microservice component.

S1013, performing, by the first microservice component, a consistent hashing calculation on the initial access data to obtain the microservice access data.

Exemplarily, in the steps of this embodiment, the first microservice component is deployed in the service instance scheduling component. Firstly, the initial access data of the upstream service is obtained in the bypass mode by the service mesh, and the initial access data is a related record of all downstream services invoked by the upstream service. For example, an upstream service caller_1 invokes three downstream services (service instances) of Service_1, Service_2, and Service_3. The initial access data obtained in the bypass mode includes access records of the above upstream service caller_1 invoking the three downstream services of Service_1, Service_2, and Service_3. Then, a data plane of the service mesh accesses the first microservice component by service discovery and transmits the above initial access data to the first microservice component based on an agreed protocol (for example, Protocol Buffers over HTTP). After receiving the initial access data sent by each upstream service, the first microservice component performs the consistent hashing calculation based on a content of the initial access data, and groups the initial access data by the service instance, to obtain access records of different service instances, including the access records of different service instances for the target instance, that is, the microservice access data. Specifically, for example, after receiving the initial access data sent by each upstream service, the first microservice component groups the initial access data by the service instance to obtain microservice access data corresponding to a plurality of downstream services (for example, a downstream service Service_1, a downstream service Service_2, and a downstream service Service_3). The downstream service Service_2 is used as the target service, and the microservice access data corresponding to the downstream service Service_2 includes access records corresponding to N service instances of the downstream service Service_2, for example, R_1, R_2, . . . , R_N.

Figure 5:
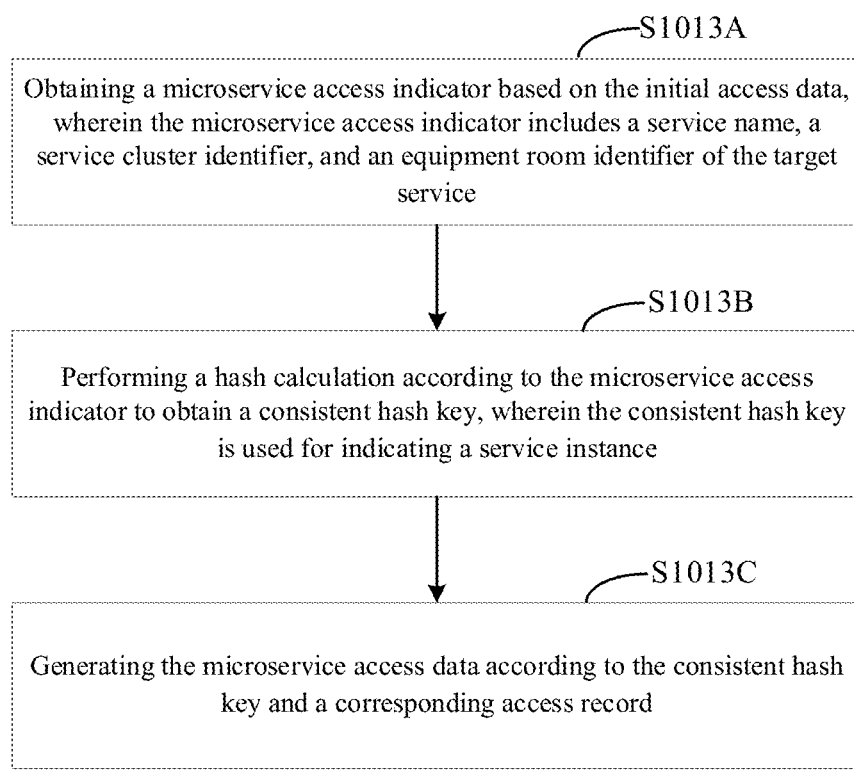
FIG. 5 is a flowchart of a specific implementation of step S1013 in the embodiment shown in FIG. 4.

Further, as shown in FIG. 5, the specific implementation of step S1013 includes the steps below.

In step S1013A, obtaining a microservice access indicator based on the initial access data, wherein the microservice access indicator includes a service name, a service cluster identifier, and an equipment room identifier of the target service.

S1013B, performing a hash calculation according to the microservice access indicator to obtain a consistent hash key, wherein the consistent hash key is used for indicating a service instance.

S1013C, generating the microservice access data according to the consistent hash key and a corresponding access record.

Exemplarily, the initial access data obtained in the bypass mode includes the microservice access indicator. The microservice access indicator includes the service name, the service cluster identifier, and the equipment room identifier of the target service. The first microservice component obtains the above microservice access indicator from the initial access data corresponding to each upstream service and performs the consistent hashing calculation, to map the microservice access indicator to the corresponding target service instance. Specifically, the data reported in the bypass mode is input into the first microservice component (different instances thereof) in a round-robin or a random manner (varies with a data source behavior). In order to implement grouping of the access records corresponding to the at least two upstream services based on the service instance, a consistent hash mechanism needs to be used for mapping, that is, the hash calculation is performed on the microservice access indicator, and a hash calculation result is used as the consistent hash key to distinguish different service instances, that is, the consistent hash key is used for indicating a service instance. Then, the access records in the initial access data and the consistent hash key corresponding to the initial access data form key-value pair data, and grouping is performed according to a key in the key-value pair data, to obtain the key-value pair data corresponding to each service instance of the target service, that is, the microservice access data.

S102, obtaining an evaluation indicator of at least one service instance corresponding to the target service according to the microservice access data, wherein the evaluation indicator represents a health degree of the service instance.

Exemplarily, after the microservice access data is obtained, the service instance scheduling component of the service mesh assesses, according to the microservice access data, a health degree of at least one service instance indicated by the microservice access data, to obtain the evaluation indicator representing the health degree of the service instance. In a possible implementation, the evaluation indicator may be determined based on a number of error requests in the access records. The error request is information generated due to a failure or an abnormality in invoking or accessing after the above service invokes the service instance of the target service downstream. The evaluation indicator may be a value inversely proportional to the number of error requests. Therefore, the higher the evaluation indicator, the higher the health degree of the service instance. In another possible implementation, the evaluation indicator may be an array, a vector, or a matrix, that is, the evaluation indicator corresponds to a plurality of evaluation dimensions, and the health degree of the service instance is represented comprehensively through the plurality of evaluation dimensions, which may be specifically set according to requirements and is not described in detail herein.

Figure 6:
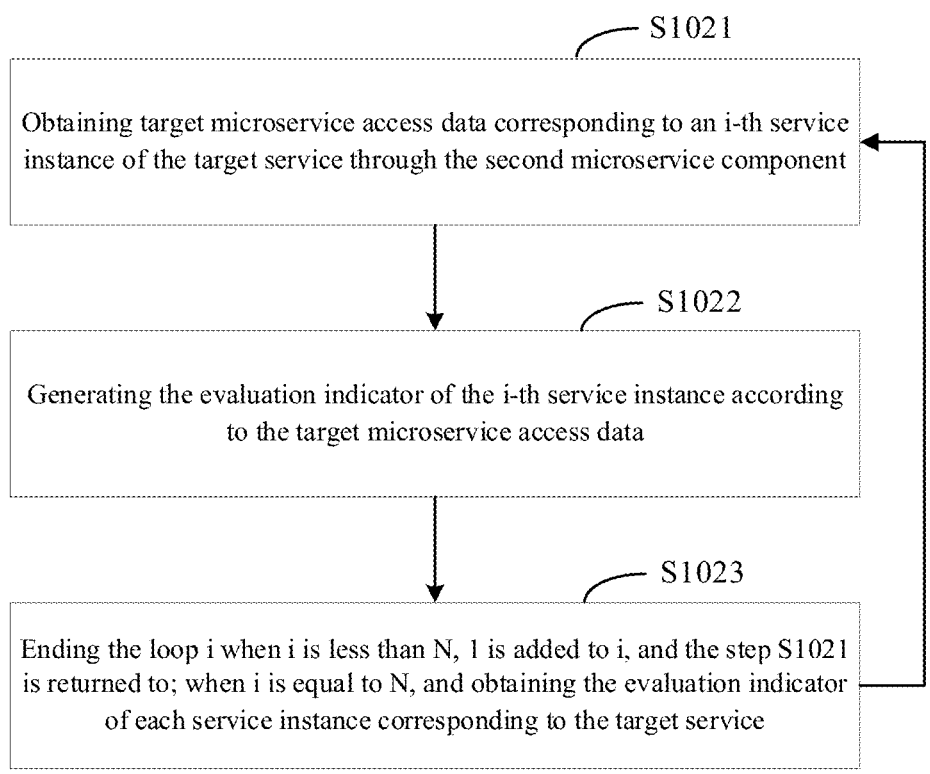
FIG. 6 is a flowchart of a specific implementation of step S102 in the embodiment shown in FIG. 2.

In a possible implementation, the second microservice component and the third microservice component are deployed in the service instance scheduling component of the service mesh. Exemplarily, the second microservice component serves as a time series database, stores the microservice access data and processes the same to obtain the evaluation indicator of the service instance and the corresponding instance weight, and the third microservice component is configured to store the instance weight of each service instance. After step S101 is performed, the method further includes step S101A: storing the microservice access data into the second microservice component based on the time series database. Correspondingly, exemplarily, the target service includes N service instances, N is an integer greater than 0, and i is an integer greater than 0 and less than or equal to N. As shown in FIG. 6, the specific implementation of step S102 includes the steps below.

S1021, obtaining target microservice access data corresponding to an i-th service instance of the target service through the second microservice component.

S1022, generating the evaluation indicator of the i-th service instance according to the target microservice access data.

S1023, ending the loop i when i is less than N, 1 is added to i, and the step S1021 is returned to; when i is equal to N, and obtaining the evaluation indicator of each service instance corresponding to the target service.

For each service instance corresponding to the target service, after the above steps are performed in sequence by the second microservice component, the health degree of each service instance is assessed, and the corresponding evaluation indicator is obtained. Because the target microservice access data is used for assessing the health degree of the target service instance, and the target microservice access data is a set of access records reported by all upstream services that access the target service instance, it is equivalent to implementing a global assessment for the target service instance, so that the obtained evaluation indicator can better reflect the actual operation state of the target service instance, thereby avoiding the problem of false fusion caused by performance fluctuation for an individual upstream service.

S103, fusing the service instance according to the evaluation indicator of the service instance.

Exemplarily, based on the preceding steps, after the evaluation indicator of the service instance is obtained, the service instance is fused, or removed, according to the evaluation indicator representing the health degree of the service instance, so that network traffic of the service instance is disconnected, and traffic redistribution (load balancing) is performed through the service mesh for a non-fused service instance. Exemplarily, the preceding fusion step may need to be implemented using a third microservice component. More specifically, an implementation of step S103 includes setting an instance weight of a target service instance whose evaluation indicator meets a first condition to zero. Exemplarily, the first condition may be a preset reference indicator used for identifying that the service instance is in an abnormal state. The instance weight is used for controlling an import process of the service instance. When the instance weight of the service instance is zero, the service instance no longer provides a service, which is equivalent to fusion. Then, optionally, after the instance weight of the service instance is updated, load balancing is performed through the service mesh on each service instance of the target service based on the instance weight of each service instance of the target service, so that other non-target service instances with a non-zero instance weight continue to provide the service, thereby completing the process of fusing the target service instance.

Figure 7:
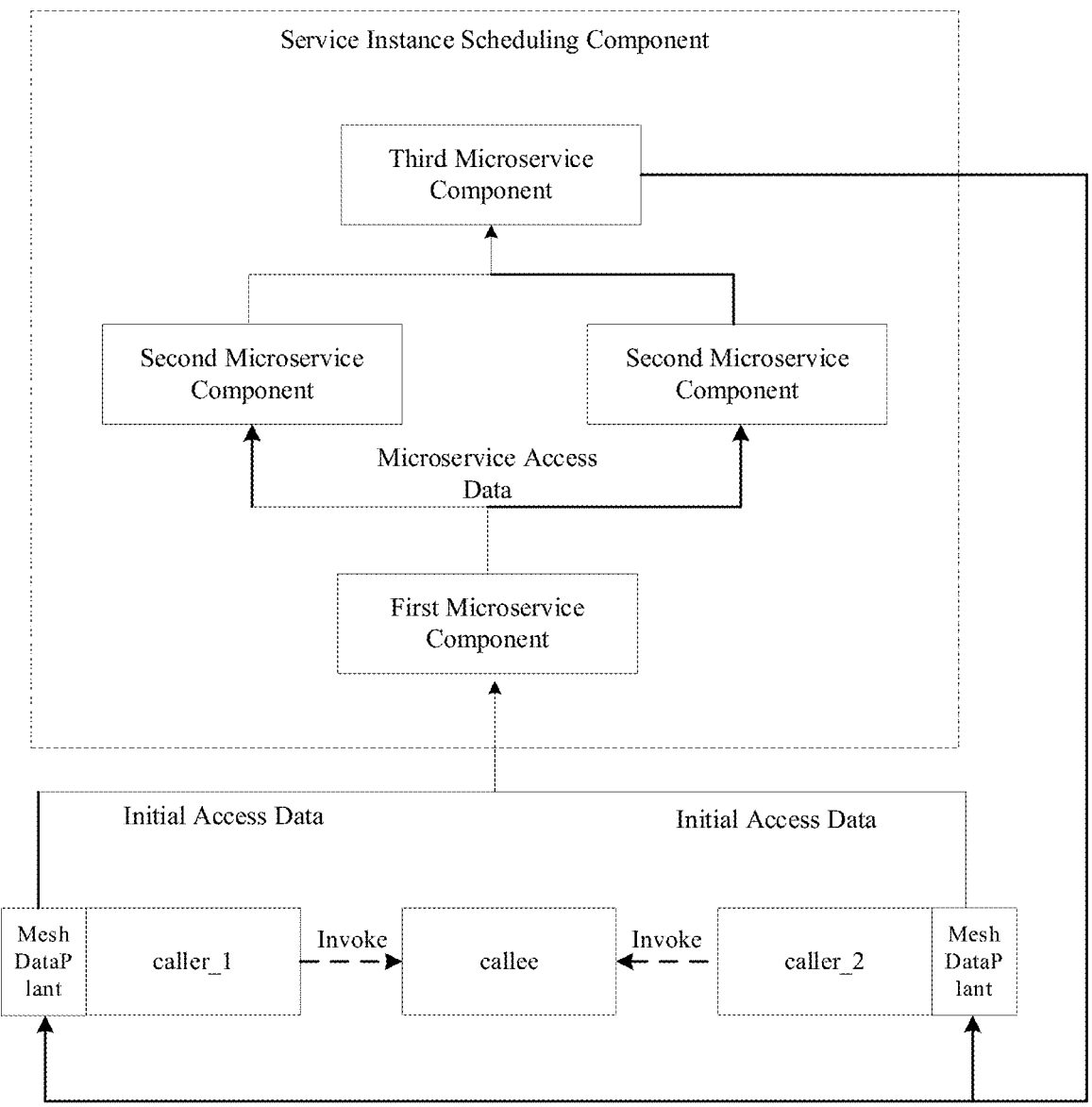
FIG. 7 is a schematic diagram of a microservice architecture according to an embodiment of the present disclosure.

FIG. 7 is a schematic diagram of a microservice architecture according to an embodiment of the present disclosure. The preceding process of fusing the service instance is described in detail below with reference to FIG. 7. As shown in FIG. 7, the service instance scheduling component includes a first microservice component, a second microservice component, and a third microservice component. The connection relationship is shown in the figure. An upstream service caller_1 and an upstream service caller_2 transmit initial access data to the first microservice component through a mesh data plane based on a bypass mode after invoking a downstream service callee. The first microservice component performs a consistent hashing calculation on the initial access data based on a service name, a service cluster identifier, and an equipment room identifier in the initial access data, to obtain the microservice access data for the service instance and stores the same into the second microservice component. Then, the second microservice component performs calculation based on the microservice access data to obtain the evaluation indicator of the service instance, determines an instance weight of each service instance based on the evaluation indicator, and stores the instance weight of the service instance into the third microservice component. Then, for example, in combination with a service discovery tool such as Consul, the instance weight of each service instance is obtained through the third microservice component, and traffic of the service instance is controlled through the instance weight, so that an available state (including a fused state and an unfused state) of each service instance corresponding to the downstream service callee is set, so that when the upstream service caller_1 and the upstream service caller_2 invoke the downstream service callee, only the service instance in the unfused state is invoked, thereby implementing fusion control of the service instance.

Further, based on different implementation manners of the evaluation indicator, there are also a plurality of implementation manners of triggering the fusion of the service instance. For example, the evaluation indicator is a specific evaluation value. Correspondingly, the first condition includes a reference indicator corresponding to the evaluation value, such as a health degree threshold, and a judgment logic that the service instance is in an abnormal state. For example, when the evaluation indicator is less than a preset health degree threshold, the evaluation indicator is judged as abnormal and the service instance is judged as being in the abnormal state, and then the service instance corresponding to the evaluation indicator is fused. For another example, when the evaluation indicator is high-dimensional data, such as a vector or a matrix, a corresponding first condition in a vector or matrix form may be used for verification. Exemplarily, the evaluation indicator may include at least two sub-indicators. The sub-indicators are verified according to a verification rule and corresponding sub-health degree thresholds included in the first condition, and after the verification is passed, the evaluation indicator is judged as abnormal and the service instance is judged as being in the abnormal state, and the corresponding service instance is fused.

Figure 8:
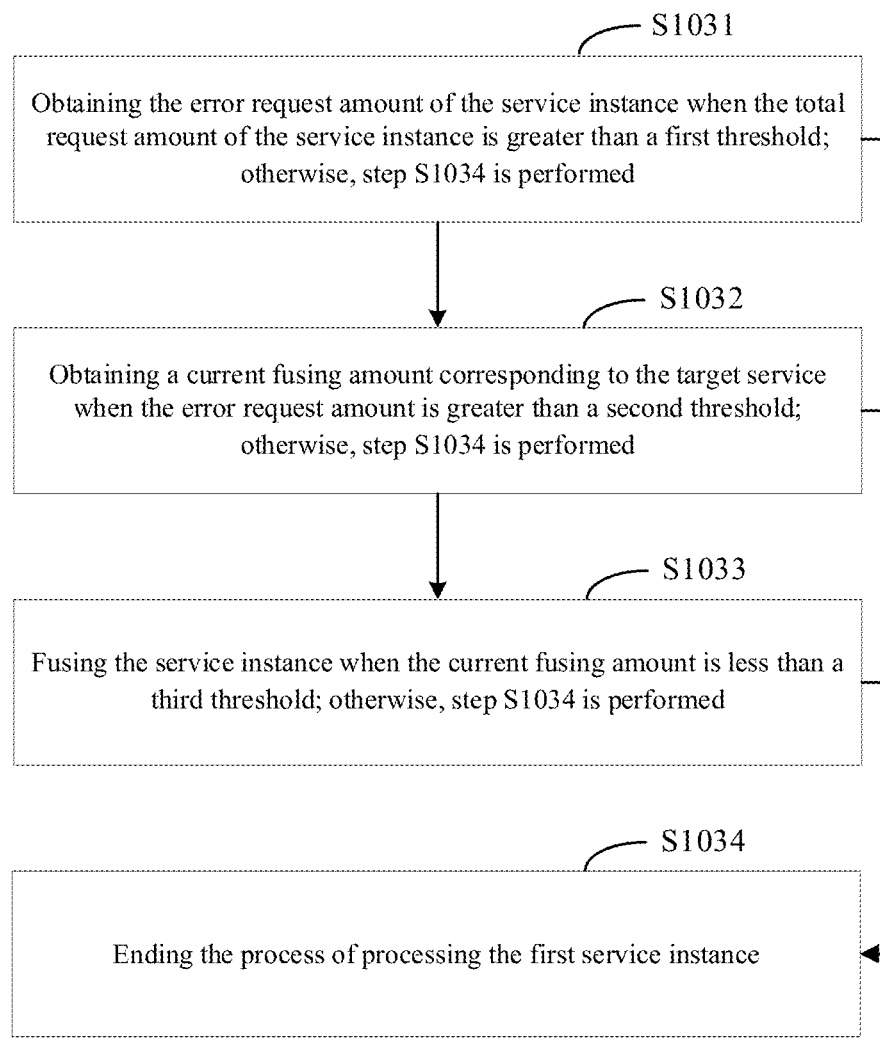
FIG. 8 is a flowchart of a specific implementation of step S103 in the embodiment shown in FIG. 2.

More specifically, in a possible implementation, the evaluation indicator includes a total request amount and an error request amount of the service instance. As shown in FIG. 8, the specific implementation of step S103 includes steps S1031 to S1034.

S1031, obtaining the error request amount of the service instance when the total request amount of the service instance is greater than a first threshold; otherwise, step S1034 is performed.

S1032, obtaining a current fusing amount corresponding to the target service when the error request amount is greater than a second threshold; otherwise, step S1034 is performed.

S1033, fusing the service instance when the current fusing amount is less than a third threshold; otherwise, step S1034 is performed.

S1034, ending the process of processing the first service instance.

Exemplarily, firstly, the second microservice component obtains, according to the evaluation indicator, a total request amount and an error request amount of the service instance instance_1 within a time window (for example, the current 30 minutes), that is, a total number of times the service instance instance_1 is invoked by at least two upstream services within the time window. The total request amount is compared with a first threshold. When the total request amount is less than or equal to the first threshold, it indicates that the service instance instance_1 is currently in an inactive state, and its operation state does not affect the overall operation of the target service. At this time, no further processing is performed on the service instance, which reduces the system load and can avoid the problem of the overall performance decline of the target service caused by false fusion, thereby ensuring the operation stability of the target service. When the total request amount is greater than or equal to the first threshold, it indicates that the service instance instance_1 is currently in an active state, and its operation state has a great impact on the overall stability of the application. Therefore, the error request amount of the service instance continues to be obtained. Then, the error request amount is compared with a second threshold. When the error request amount is less than or equal to the second threshold, it indicates that, from a global perspective (all upstream services that invoke the service instance), the service instance instance_1 currently has a good health degree, and temporary performance fluctuation does not affect the overall target service. At this time, no processing is performed on the service instance, which also reduces the system load and avoids the effect of the overall performance decline of the target service caused by false fusion. When the error request amount is greater than or equal to the second threshold, the current health degree of the service instance instance_1 is poor, and then a current fusing amount, that is, a number of service instances in a fused state among all current service instances corresponding to the target service, is further obtained. When the current fusing amount is too high, that is, when the current fusing amount is greater than a third threshold, the performance of a current available service instance starts to decline due to an excessively small number of available service instances and an excessively large load allocated to each service instance, which ultimately causes a sharp decline in the overall performance of the target service. To avoid this problem, the current fusing amount is less than the third threshold, and the service instance is fused. When the current fusing amount is greater than the third threshold, the service instance is no longer fused, thereby ensuring that the overall performance of the target service does not decline due to spiral pressure and improving the operation stability of the target service.

In the service instance scheduling method and apparatus, the electronic device, and the storage medium provided in this embodiment, the microservice access data for the target service is obtained in the bypass mode based on the service mesh, wherein the microservice access data represents the access records of the at least two upstream services of the target service with respect to the service instance of the target service. The evaluation indicator of the at least one service instance corresponding to the target service is obtained according to the microservice access data, where the evaluation indicator represents the health degree of the service instance. The service instance is fused according to the evaluation indicator of the service instance. The access records of the at least two upstream services of the target service with respect to the service instance of the target service are obtained in the bypass mode, and the evaluation indicator of the service instance is generated to represent the health degree of the service instance, so that the health degree of the service instance is assessed in a global field of vision. Then, the service instance is fused based on the evaluation indicator, so that the rationality of fusing the service instance is ensured, thereby improving the overall performance and operation stability of the service.

Figure 9:
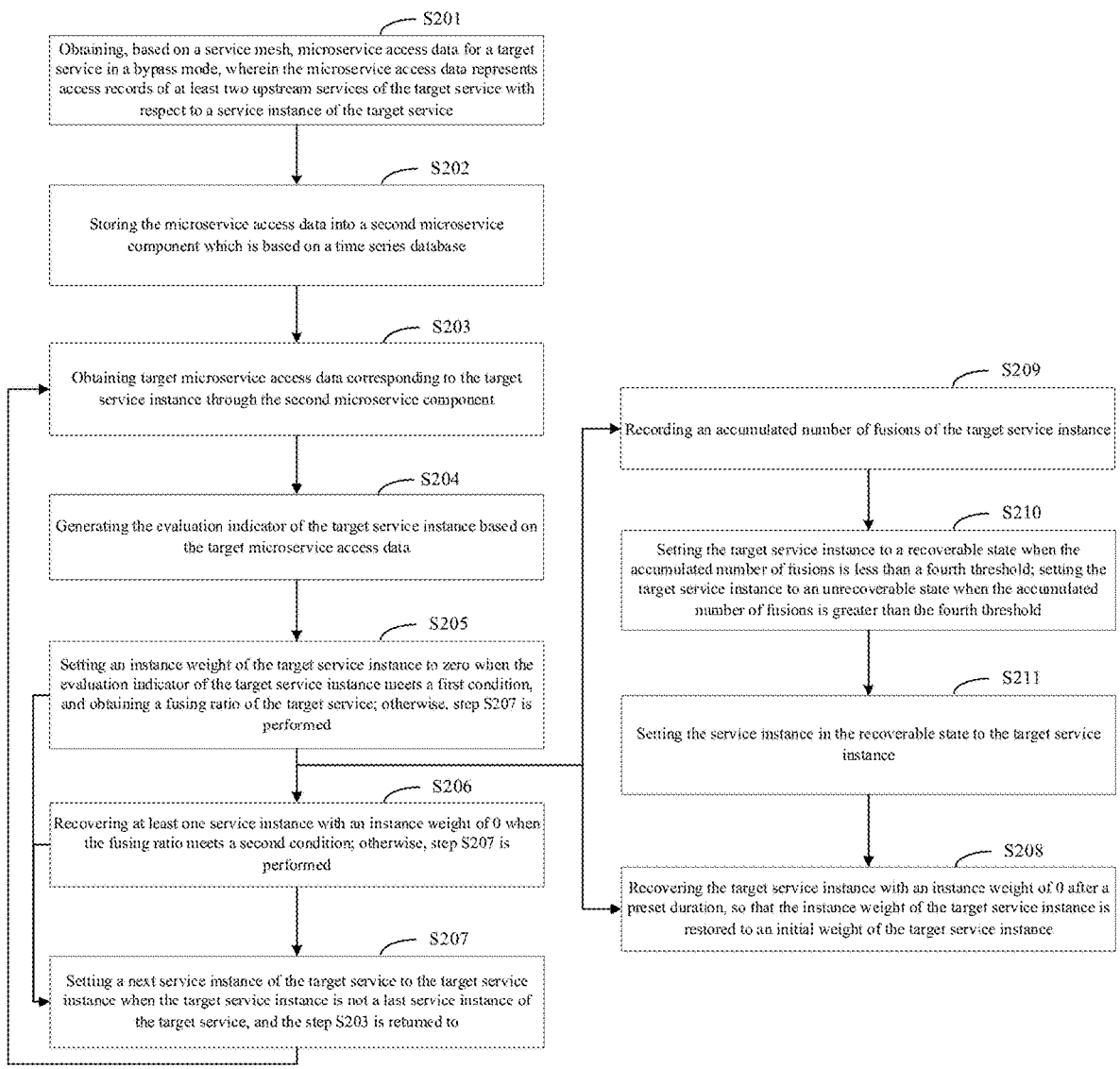
FIG. 9 is a second schematic flowchart of a service instance scheduling method according to an embodiment of the present disclosure.

Referring to FIG. 9, FIG. 9 is a second schematic flowchart of a service instance scheduling method according to an embodiment of the present disclosure. The embodiment is based on the embodiment shown in FIG. 2, and further refines steps S102 to S103 and adds the process of recovering the service instance. The service instance scheduling method includes the steps below.

S201, obtaining, based on a service mesh, microservice access data for a target service in a bypass mode, wherein the microservice access data represents access records of at least two upstream services of the target service with respect to a service instance of the target service.

S202, storing the microservice access data into a second microservice component which is based on a time series database.

S203, obtaining target microservice access data corresponding to the target service instance through the second microservice component.

S204, generating the evaluation indicator of the target service instance based on the target microservice access data.

Exemplarily, referring to the schematic diagram of the microservice architecture shown in FIG. 7, in this embodiment, the microservice access data is obtained through the first microservice component, and then the second microservice component traverses all stored service instances of the target service, for example, traverses all instances in a service cluster machine room corresponding to the target service. The target service instance (that is, the current service instance) refers to a service instance as a processing target in a traversal process. For example, when the target service corresponds to 100 service instances, the service instance i involved in the i-th round of traversal in a process of traversing from the first service instance to the last instance is the target service instance (the current service instance), where i is an integer greater than or equal to 1 and less than or equal to 100.

Further, in each traversal process, for the target service instance, the target microservice access data corresponding to the target service instance, that is, a set of access records for invoking the target service instance (service instance i), is obtained through the second microservice component. Then, the corresponding evaluation indicator representing the health degree of the target service instance is generated according to the access records. The specific manner of generating the evaluation indicator has been described in detail in step S102 in the embodiment shown in FIG. 2 and is not described in detail herein.

S205, setting an instance weight of the target service instance to zero when the evaluation indicator of the target service instance meets a first condition, and obtaining a fusing ratio of the target service; otherwise, step S207 is performed.

S206, recovering at least one service instance with an instance weight of 0 when the fusing ratio meets a second condition; otherwise, step S207 is performed.

Further, when the service instance is fused, the fusion processing is implemented by controlling the instance weight to be zero. The fusing ratio represents a ratio value of a service instance with an instance weight of 0 corresponding to the target service to all service instances. After the evaluation indicator of the target service instance is obtained, when the evaluation indicator meets the first condition, it is determined that the target service instance is in an abnormal state and needs to be fused. Specifically, after the target service instance is fused, the fusing ratio of the target service is obtained, where the fusing ratio represents a ratio value of a service instance in a fused state to all service instances corresponding to the target service. Then, according to the fusing ratio, the recovery processing on the service instance in the fused state is controlled. Specifically, when the service instance is fused, the instance weight of the target service instance is set to 0, so that the traffic of the target service instance is 0 and the target service instance cannot provide a service to the outside, thereby implementing the fusion of the target service instance. On the other hand, the fusing ratio of the target service is further obtained before or after the instance weight of the target service instance is set to zero, wherein the fusing ratio represents the ratio value of the service instance with an instance weight of 0 corresponding to the target service to all service instances.

Further, when the fusing ratio meets a second condition, for example, when the fusion proportion value is greater than a preset proportion threshold or within a certain proportion interval, the service instance fused previously is recovered, so as to avoid the problem of the overall performance decline of the target service and difficulty in providing the service due to an excessive number of fusions. In addition, other information may be further obtained for making a judgment before the service instance is recovered, such as a system load rate and a system access volume. The second condition includes corresponding information used for verifying information such as the system load rate and the system access volume. Further, when the recovery of the fused service instance is triggered as the fusing ratio (or together with the preceding other information) meets the second condition, all service instances in the fused state of the target service may be recovered (rolled back), that is, the instance weight of the service instance in the fused state is restored to a preset configuration value, or only a part of service instances in the fused state of the target service may be recovered, for example, sorting is performed according to a fusion duration, and N service instances in the fused state for the longest time are recovered, so that the probability of an abnormal service instance is reduced to the greatest extent on the basis of ensuring the overall performance of the target service, thereby improving the operation stability of the target service.

S207, setting a next service instance of the target service to the target service instance when the target service instance is not a last service instance of the target service, and the step S203 is returned to.

Thereafter, after the processing steps for the target service instance are completed, when the target service instance is not the last service instance of the target service, the next service instance of the target service is processed in step S203, and the preceding process is repeated. When the target service instance is the last service instance of the target service, the loop is ended. In this way, all service instances meeting requirements of the target service are fused according to the fusion rule, thereby achieving the objective of service instance scheduling.

Optionally, after step S207, the method further includes step S208.

S208, recovering the target service instance with an instance weight of 0 after a preset duration, so that the instance weight of the target service instance is restored to an initial weight of the target service instance.

Exemplarily, an abnormality of a service instance is usually caused by reasons such as network fluctuation, tight resources, and excessive requests. After the service instance is fused, the service instance may work normally after factors such as network fluctuation that cause the abnormality of the service instance disappear. Therefore, after the service instance is fused for a certain period of time, the fused service instance is recovered, so that the performance of the target service can be always maintained at a high level. The recovery (also referred to as self-healing) of the service instance in the fused state is a process of recovering the target service instance with an instance weight of 0. Specifically, the fusion and recovery of the service instance are controlled by the instance weight. Therefore, the import process may be reintroduced to the service instance by restoring (increasing) the instance weight, so that the service instance is recovered.

Exemplarily, a specific implementation of step S208 includes steps S2081 and S2082.

S2081, obtaining a preset target multiplier.

S2082, increasing the instance weight of the target service instance in each recovery period based on the target multiplier in sequence until the instance weight reaches the initial weight.

Exemplarily, in the process of restoring the instance weight of the service instance, a stepwise restoration is performed at the preset target multiplier. For example, the target multiplier is 2%. When the service instance instance_1 in the fused state is restored, the instance weight of the service instance instance_1 is set to 2% (times the initial weight) from 0 (times the initial weight). After one recovery period (for example, 1 minute), an accumulation is performed at a multiple of 2%, and the instance weight of the service instance instance_1 is set to 4% from 2%. After another recovery period, the instance weight of the service instance instance_1 is set to 6% from 4%, and so on, until the instance weight of the service instance instance_1 is restored to 100%, that is, the initial weight of the instance weight.

Step S208 in this embodiment, that is, the step of recovering the service instance, is executed by the service instance scheduling component of the service mesh and may be performed asynchronously with steps S201 to S207 described above, that is, the step of fusing the service instance. The step of recovering the service instance and the step of fusing the service instance are independent of each other.

In this embodiment, the instance weight of the service instance in the fused state is restored gradually, so that the problem of an excessively large traffic and re-triggering an abnormality of the service instance due to the instance weight being set to the initial weight at once is avoided, and the system stability is improved. In addition, in the recovery stage of the service instance, the instance weight of the service instance is increased with the preset target multiplier to release the traffic until the instance weight is equal to the initial weight when the service instance is registered. When a problem still occurs in the recovery process of the service instance, the service instance is fused again according to the preceding steps with the recovery period. Therefore, the recovery stage is equivalent to the start-up warm-up of the service instance, which can avoid a large number of reported errors due to massive traffic release when the service instance has a continuous problem, thereby further improving the stability of the target service.

Optionally, after step S205, the method further includes steps S209 to S211.

S209, recording an accumulated number of fusions of the target service instance.

S210, setting the target service instance to a recoverable state when the accumulated number of fusions is less than a fourth threshold; setting the target service instance to an unrecoverable state when the accumulated number of fusions is greater than the fourth threshold.

S211, setting the service instance in the recoverable state to the target service instance.

Exemplarily, on the other hand, in the preceding traversal process, when the evaluation indicator of the target service instance meets the first condition, the target service instance is fused, and at the same time, the accumulated number of fusions of the target service instance is recorded. After all service instances of the target service are traversed or during the traversal process, the corresponding recovery state is set according to the accumulated number of fusions of each service instance in the fused state. When the accumulated number of fusions is greater than the fourth threshold, the recovery state is set to an unrecoverable state. Then, before the service instance is recovered, whether the service instance is in the recoverable state is first determined. When the service instance is in the recoverable state (that is, the number of fusions is less than the fourth threshold), the service instance is determined as the target service instance, and then the subsequent step S208 is performed, so that the service instance is restored to a working state. When the service instance is in the unrecoverable state, the service instance is not processed, or only prompt information or log information is generated and returned to a user terminal for prompting, so that the abnormal service instance caused by software and hardware problems is eliminated, thereby reducing resource overhead caused by repeated fusion and recovery of the service instance and further improving the stability of the target service.

In this embodiment, the implementation of step S201 is the same as the implementation of step S101 in the embodiment shown in FIG. 2 of the present disclosure and is not described herein.

Figure 10:
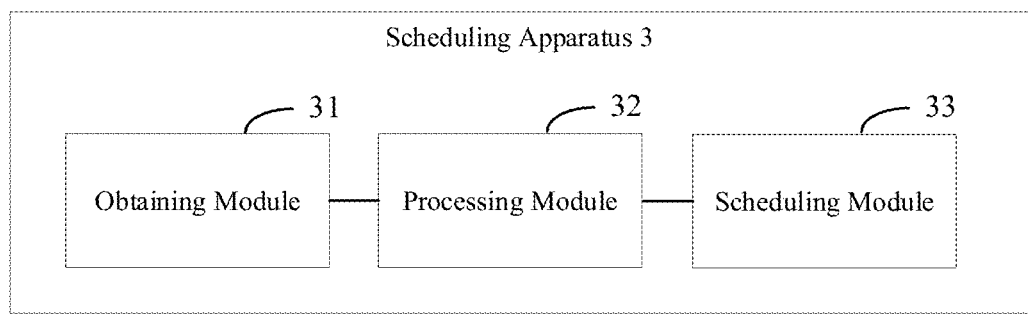
FIG. 10 is a block diagram of a service instance scheduling apparatus according to an embodiment of the present disclosure.

Corresponding to the service instance scheduling method in the preceding embodiment, FIG. 10 is a block diagram of a structure of a service instance scheduling apparatus according to an embodiment of the present disclosure. For ease of illustration, only parts related to the embodiments of the present disclosure are shown. Referring to FIG. 10, the service instance scheduling apparatus 3 includes an obtaining module 31, a processing module 32, and a scheduling module 33.

The obtaining module 31 is configured to obtain, based on a service mesh, microservice access data for a target service in a bypass mode, wherein the microservice access data represents access records of at least two upstream services of the target service with respect to a service instance of the target service.

The processing module 32 is configured to obtain an evaluation indicator of at least one service instance corresponding to the target service according to the microservice access data, wherein the evaluation indicator represents a health degree of the service instance.

The scheduling module 33 is configured to fuse the service instance according to the evaluation indicator of the service instance.

In one embodiment of the present disclosure, the obtaining module 31 is specifically configured to: obtain, in the bypass mode, initial access data of the upstream services through the service mesh, wherein the initial access data represents access records for the target service; perform, through the service mesh, service discovery, access a first microservice component, and transmit the initial access data to the first microservice component; and perform by the first microservice component, a consistent hashing calculation on the initial access data to obtain the microservice access data.

In one embodiment of the present disclosure, when performing the consistent hashing calculation on the initial access data by the first microservice component, to obtain the microservice access data, the obtaining module 31 is specifically configured to: obtain, based on the initial access data, a microservice access indicator, wherein the microservice access indicator includes a service name, a service cluster identifier, and an equipment room identifier of the target service; perform a hash calculation according to the microservice access indicator to obtain a consistent hash key, wherein the consistent hash key is used for indicating a service instance; and generate the microservice access data according to the consistent hash key and a corresponding access record.

In one embodiment of the present disclosure, after obtaining, in the bypass mode, the microservice access data for the target service, the obtaining module 31 is further configured to: store the microservice access data into a second microservice component which is based on a time series database. The processing module 32 is specifically configured to: for each service instance corresponding to the target service, perform the following steps in sequence by the second microservice component: obtain target microservice access data corresponding to the target service instance; and generate the evaluation indicator of the target service instance based on the target microservice access data.

In one embodiment of the present disclosure, the scheduling module 33 is specifically configured to: fuse the target service instance when the evaluation indicator of the target service instance meets a first condition.

In one embodiment of the present disclosure, the scheduling module 33 is further configured to: obtain, after the target service instance is fused, a fusing ratio of the target service, wherein the fusing ratio represents a ratio value of a service instance in a fused state to all service instances corresponding to the target service; and, recover at least one service instance in the fused state when the fusing ratio meets a second condition.

In one embodiment of the present disclosure, the evaluation indicator includes a total request amount and an error request amount of the service instance. The scheduling module 33 is specifically configured to: obtain the error request amount of the service instance when the total request amount of the service instance is greater than a first threshold; obtain a current fusing amount corresponding to the target service when the error request amount is greater than a second threshold; and fuse the service instance when the current fusing amount is less than a third threshold In one embodiment of the present disclosure, the scheduling module 33 is specifically configured to: set an instance weight of a target service instance whose evaluation indicator meets a first condition to zero. The scheduling module 33 is further configured to: recover the target service instance after a preset duration, so that the instance weight of the target service instance is restored to an initial weight of the target service instance; and/or, perform, by the service mesh, load balancing on each service instance of the target service based on the instance weight.

In one embodiment of the present disclosure, when recovering the target service instance, the scheduling module 33 is specifically configured to: obtain a preset target multiplier; and increase the instance weight of the target service instance in each recovery period in sequence based on the target multiplier until the instance weight reaches an initial weight.

In one embodiment of the present disclosure, after the instance weight of the target service instance is set to zero, the scheduling module 33 is further configured to: record an accumulated number of fusions of the target service instance; and set the target service instance to a recoverable state according to the accumulated number of fusions when the accumulated number of fusions is less than a fourth threshold. When recovering the target service instance, the scheduling module 33 is specifically configured to: recover the target service instance when the target service instance is in the recoverable state.

The obtaining module 31, the processing module 32, and the scheduling module 33 are connected in sequence. The service instance scheduling apparatus 3 provided in this embodiment may perform the technical solutions of the preceding method embodiments, and implementation principles and technical effects thereof are similar, which are not described herein again in this embodiment.

Figure 11:
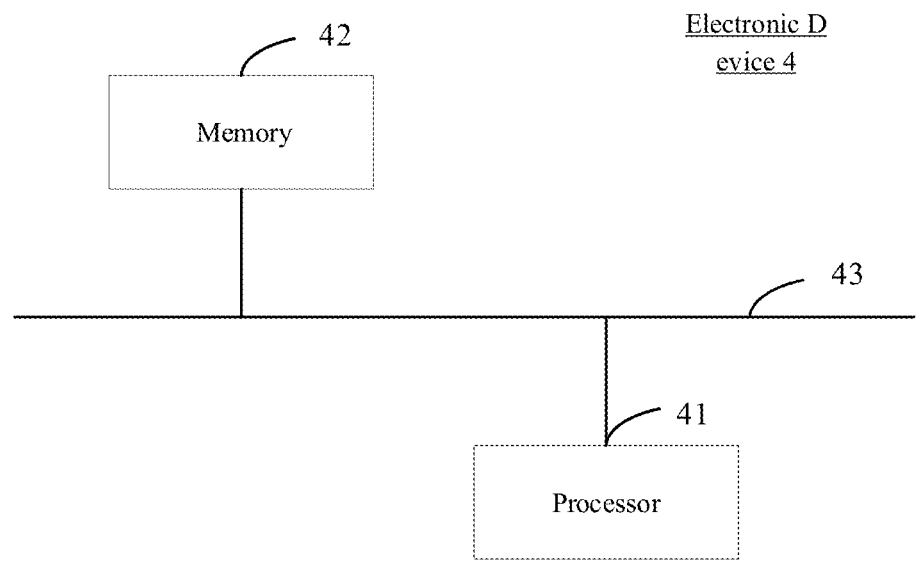
FIG. 11 is a schematic diagram of a structure of an electronic device according to an embodiment of the present disclosure.

FIG. 11 is a schematic diagram of a structure of an electronic device according to an embodiment of the present disclosure. As shown in FIG. 11, the electronic device 4 includes a processor 41 and a memory 42.

The memory 42 is communicatively connected to the processor 41.

The memory 42 stores computer execution instructions.

The processor 41 executes the computer execution instructions stored in the memory 42 to implement the service instance scheduling method in the embodiments shown in FIG. 2 to FIG. 9.

Optionally, the processor 41 and the memory 42 are connected through a bus 43.

For related descriptions, reference may be made to related descriptions and effects corresponding to the steps in the embodiments shown in FIG. 2 to FIG. 9 for understanding, which are not described in detail herein.

An embodiment of the present disclosure provides a computer-readable storage medium, where the computer-readable storage medium stores computer execution instructions, and the computer execution instructions, when executed by a processor, are used for implementing the service instance scheduling provided in any one of the embodiments shown in FIG. 2 to FIG. 9 in the present disclosure.

An embodiment of the present disclosure provides a computer program product, including a computer program, where the computer program, when executed by a processor, implements the service instance scheduling provided in any one of the embodiments shown in FIG. 2 to Fig. in the present disclosure.

In order to implement the preceding embodiments, an embodiment of the present disclosure further provides an electronic device.

Figure 12:
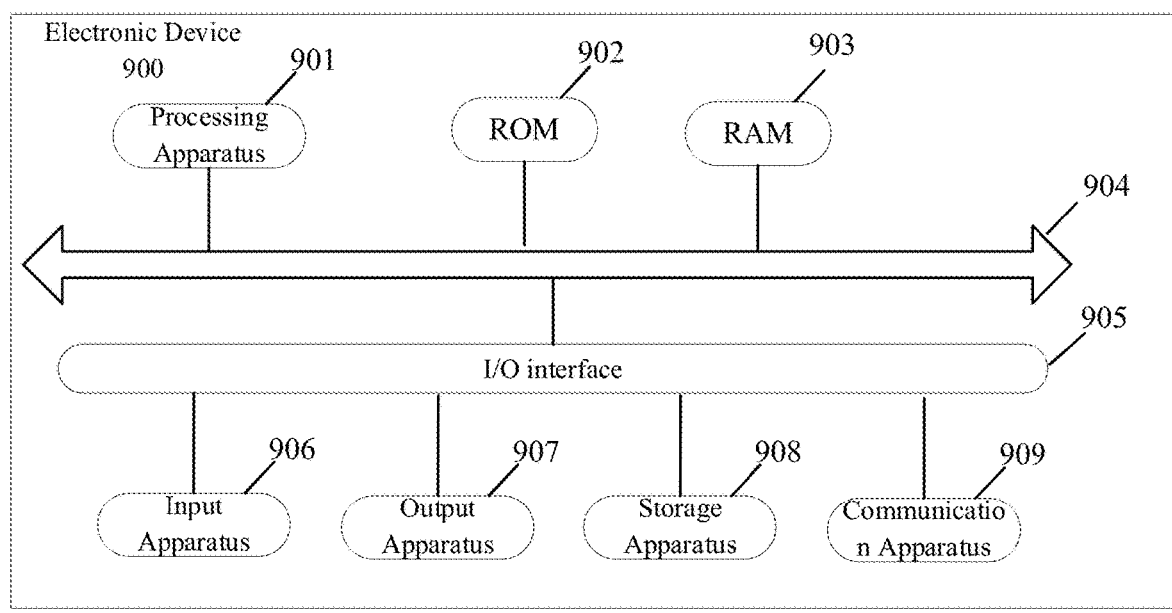
FIG. 12 is a schematic diagram of a hardware structure of an electronic device according to an embodiment of the present disclosure.

Referring to FIG. 12, FIG. 12 is a schematic diagram of a structure of an electronic device 900 suitable for implementing an embodiment of the present disclosure. The electronic device 900 may be a terminal device or a server. The terminal device may include, but is not limited to, a mobile terminal such as a mobile phone, a laptop, a digital broadcast receiver, a personal digital assistant (PDA), a tablet computer, a portable media player (PMP), a vehicle-mounted terminal (e.g., a vehicle-mounted navigation terminal), etc., and a fixed terminal such as a digital TV, a desktop computer, etc. The electronic device shown in FIG. 12 is merely an example and should not impose any limitation to the function and scope of use of the embodiments of the present disclosure.

As shown in FIG. 12, the electronic device 900 may include a processing apparatus (e.g., a central processing unit, a graphics processing unit, etc.) 901. The processing apparatus 901 may perform various appropriate actions and processing according to a program stored in a read-only memory (ROM) 902 or a program loaded from a storage apparatus 908 into a random-access memory (RAM) 903. The RAM 903 further stores various programs and data required for operations of the electronic device 900. The processing apparatus 901, the ROM 902, and the RAM 903 are connected to each other through a bus 904. An input/output (I/O) interface 905 is also connected to the bus 904.

Generally, the following apparatuses may be connected to the I/O interface 905: an input apparatus 906 including, for example, a touchscreen, a touchpad, a keyboard, a mouse, a camera, a microphone, an accelerometer, a gyroscope, and the like; an output apparatus 907 including, for example, a liquid crystal display (LCD), a speaker, a vibrator, and the like; a storage apparatus 908 including, for example, a magnetic tape, a hard disk, and the like; and a communication apparatus 909. The communication apparatus 909 may allow the electronic device 900 to perform wireless or wired communication with other devices to exchange data. Although FIG. 12 shows the electronic device 900 having various apparatuses, it should be understood that it is not required to implement or have all of the shown apparatuses. More or fewer apparatuses may be implemented or provided alternatively.

In particular, according to an embodiment of the present disclosure, the process described above with reference to the flowchart may be implemented as a computer software program. For example, an embodiment of the present disclosure includes a computer program product, which includes a computer program carried on a computer-readable medium. The computer program includes program code for performing the method shown in the flowchart. In such an embodiment, the computer program may be downloaded and installed from a network through the communication apparatus 909, or installed from the storage apparatus 908, or installed from the ROM 902. When the computer program is executed by the processing apparatus 901, the preceding functions defined in the method of the embodiments of the present disclosure are executed.

It should be noted that the preceding computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. More specific examples of the computer-readable storage medium may include, but are not limited to, an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that contains or stores a program. The program may be used by or in combination with an instruction execution system, apparatus, or device. In the present disclosure, the computer-readable signal medium may include a data signal propagated in a baseband or as a part of a carrier, where computer-readable program code is carried in the data signal. The data signal propagated in this manner may be in various forms, including but not limited to an electromagnetic signal, an optical signal, or any suitable combination thereof. The computer-readable signal medium may also be any computer-readable medium other than the computer-readable storage medium. The computer-readable signal medium may send, propagate, or transmit a program used by or in combination with an instruction execution system, apparatus, or device. The program code contained on the computer-readable medium may be transmitted by any suitable medium, including but not limited to a wire, an optical cable, radio frequency (RF), or any suitable combination thereof.

The computer-readable medium may be included in the electronic device or may exist alone without being assembled into the electronic device.

The computer-readable medium carries one or more programs, and when the one or more programs are executed by the electronic device, the electronic device is caused to perform the method shown in the preceding embodiments.

The computer program code for performing the operations of the present disclosure may be written in one or more programming languages or a combination thereof. The preceding one or more programming languages include object-oriented programming languages such as Java, Smalltalk, C++, and also include conventional procedural programming languages such as the "C" programming language or similar programming languages. The program code may by executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the drawings illustrate the architecture, functionality, and operation of possible implementations of systems, methods, and computer program products according to various embodiments of the present disclosure. In this regard, each block in the flowcharts or block diagrams may represent a module, a program segment, or a portion of code, which includes one or more executable instructions for implementing specified logical functions. It should also be noted that, in some alternative implementations, the functions noted in the block may occur out of the order noted in the drawings. For example, two blocks shown in succession may, in fact, can be executed substantially concurrently, or the blocks may sometimes be executed in the reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may be implemented by a combination of dedicated hardware and computer instructions.

The units or modules involved in the embodiments of the present disclosure may be implemented in software or hardware. The name of a unit or module is not intended to limit the unit in certain cases.

The functions described herein may be performed, at least in part, by one or more hardware logic components. For example, without limitation, exemplary types of hardware logic components that may be used include a field-programmable gate array (FPGA), an application-specific integrated circuit (ASIC), an application-specific standard product (ASSP), a system on a chip (SOC), a complex programmable logic device (CPLD), and the like.

In the context of the present disclosure, a machine-readable medium may be a tangible medium that may contain or store a program for use by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In a first aspect, one or more embodiments of the present disclosure provide a service instance scheduling method, including:

obtaining, based on a service mesh, microservice access data for a target service in a bypass mode, wherein the microservice access data represents access records of at least two upstream services of the target service with respect to a service instance of the target service; obtaining an evaluation indicator of at least one service instance corresponding to the target service according to the microservice access data, wherein the evaluation indicator represents a health degree of the service instance; and fusing the service instance according to the evaluation indicator of the service instance.

According to one or more embodiments of the present disclosure, obtaining, based on the service mesh, the microservice access data for the target service in the bypass mode includes: obtaining, in the bypass mode, initial access data of the upstream services through the service mesh, wherein the initial access data represents access records for the target service; performing, through the service mesh, service discovery, accessing a first microservice component, and transmitting the initial access data to the first microservice component; and performing, by the first microservice component, a consistent hashing calculation on the initial access data to obtain the microservice access data.

According to one or more embodiments of the present disclosure, the performing the consistent hashing calculation on the initial access data by the first microservice component, to obtain the microservice access data includes:

obtaining, based on the initial access data, a microservice access indicator, wherein the microservice access indicator includes a service name, a service cluster identifier, and an equipment room identifier of the target service; performing a hash calculation according to the microservice access indicator to obtain a consistent hash key, wherein the consistent hash key is used for indicating a service instance; and generating the microservice access data according to the consistent hash key and a corresponding access record.

According to one or more embodiments of the present disclosure, after the obtaining the microservice access data for the target service in the bypass mode, the method further includes: storing the microservice access data into a second microservice component which is based on a time series database; and wherein obtaining the evaluation indicator of the at least one service instance corresponding to the target service according to the microservice access data includes: for each service instance corresponding to the target service, performing the following steps in sequence by the second microservice component: obtaining target microservice access data corresponding to the target service instance; and generating the evaluation indicator of the target service instance based on the target microservice access data.

According to one or more embodiments of the present disclosure, the fusing the service instance according to the evaluation indicator of the service instance includes: fusing the target service instance when the evaluation indicator of the target service instance meets a first condition.

According to one or more embodiments of the present disclosure, the method further includes: obtaining, after the target service instance is fused, a fusing ratio of the target service, where the fusing ratio represents a ratio value of a service instance in a fused state to all service instances corresponding to the target service; and when the fusing ratio meets a second condition, recovering at least one service instance in the fused state.

According to one or more embodiments of the present disclosure, the evaluation indicator includes a total request amount and an error request amount of the service instance; and fusing the service instance according to the evaluation indicator of the service instance includes: obtaining the error request amount of the service instance when the total request amount of the service instance is greater than a first threshold; obtaining a current fusing amount corresponding to the target service when the error request amount is greater than a second threshold; and fusing the service instance when the current fusing amount is less than a third threshold.

According to one or more embodiments of the present disclosure, fusing the service instance according to the evaluation indicator of the service instance includes: setting an instance weight of a target service instance whose evaluation indicator meets a first condition to zero.

According to one or more embodiments of the present disclosure, fusing the service instance includes: implementing fusion processing by controlling an instance weight to be zero. The method further includes: recovering the target service instance after a preset duration, so that the instance weight of the target service instance is restored to an initial weight of the target service instance; and/or, performing, by the service mesh, load balancing on each service instance of the target service based on the instance weight.

According to one or more embodiments of the present disclosure, the recovering the target service instance includes: obtaining a preset target multiplier; and increasing the instance weight of the target service instance in each recovery period in sequence based on the target multiplier until the instance weight reaches the initial weight.

According to one or more embodiments of the present disclosure, after the instance weight of the target service instance is set to zero, the method further includes: recording an accumulated number of fusions of the target service instance; and setting the target service instance to a recoverable state according to the accumulated number of fusions when the accumulated number of fusions is less than a fourth threshold. The recovering the target service instance includes: recovering the target service instance when the target service instance is in the recoverable state.

In a second aspect, one or more embodiments of the present disclosure provide a service instance scheduling apparatus, including:

an obtaining module, configured to obtain, based on a service mesh, microservice access data for a target service in a bypass mode, where the microservice access data represents access records of at least two upstream services of the target service with respect to a service instance of the target service;

a processing module, configured to obtain an evaluation indicator of at least one service instance corresponding to the target service according to the microservice access data, where the evaluation indicator represents a health degree of the service instance; and a scheduling module, configured to fuse the service instance according to the evaluation indicator of the service instance.

According to one or more embodiments of the present disclosure, the obtaining module is specifically configured to: obtain initial access data of the upstream service in the bypass mode through the service mesh, where the initial access data represents access records for the target service; perform service discovery through the service mesh, access a first microservice component, and send the initial access data to the first microservice component; and perform a consistent hashing calculation on the initial access data by the first microservice component, to obtain the microservice access data.

According to one or more embodiments of the present disclosure, when performing the consistent hashing calculation on the initial access data by the first microservice component, to obtain the microservice access data, the obtaining module is specifically configured to: obtain a microservice access indicator based on the initial access data, where the microservice access indicator includes a service name, a service cluster identifier, and an equipment room identifier of the target service; perform a hash calculation according to the microservice access indicator to obtain a consistent hash key, where the consistent hash key is used for indicating a service instance; and generate the microservice access data according to the consistent hash key and a corresponding access record.

According to one or more embodiments of the present disclosure, after the obtaining the microservice access data for the target service in the bypass mode, the obtaining module is further configured to: store the microservice access data into a second microservice component based on a time series database; and the processing module is specifically configured to: for each service instance corresponding to the target service, perform the following steps in sequence by the second microservice component: obtain target microservice access data corresponding to the target service instance; and generate the evaluation indicator of the target service instance based on the target microservice access data.

According to one or more embodiments of the present disclosure, the scheduling module is specifically configured to: fuse the target service instance when the evaluation indicator of the target service instance meets a first condition.

According to one or more embodiments of the present disclosure, the scheduling module is further configured to: after the target service instance is fused, obtain a fusing ratio of the target service, where the fusing ratio represents a ratio value of a service instance in a fused state to all service instances corresponding to the target service; and when the fusing ratio meets a second condition, recover at least one service instance in the fused state.

According to one or more embodiments of the present disclosure, the evaluation indicator includes a total request amount and an error request amount of the service instance; and the scheduling module is specifically configured to: when the total request amount of the service instance is greater than a first threshold, obtain the error request amount of the service instance; when the error request amount is greater than a second threshold, obtain a current fusing amount corresponding to the target service; and when the current fusing amount is less than a third threshold, fuse the service instance.

According to one or more embodiments of the present disclosure, the scheduling module is specifically configured to: set an instance weight of a target service instance whose evaluation indicator meets a first condition to zero. The scheduling module is further configured to: recover the target service instance after a preset duration, so that the instance weight of the target service instance is restored to an initial weight of the target service instance; and/or, perform, through the service mesh, load balancing on each service instance of the target service based on the instance weight.

According to one or more embodiments of the present disclosure, after the instance weight of the target service instance is set to zero, the scheduling module is further configured to: record an accumulated number of fusions of the target service instance; and set the target service instance to a recoverable state according to the accumulated number of fusions when the accumulated number of fusions is less than a fourth threshold. When recovering the target service instance, the scheduling module is specifically configured to: recover the target service instance when the target service instance is in the recoverable state.

In a third aspect, one or more embodiments of the present disclosure provide an electronic device, including: at least one processor and a memory; where the memory stores computer execution instructions; and the at least one processor executes the computer execution instructions stored in the memory, to cause the at least one processor to perform the service instance scheduling method according to the first aspect and various possible designs of the first aspect.

In a fourth aspect, one or more embodiments of the present disclosure provide a computer-readable storage medium, wherein the computer-readable storage medium stores computer execution instructions, and when the processor executes the computer execution instructions, the service instance scheduling method according to the first aspect and various possible designs of the first aspect is implemented.

In a fifth aspect, one or more embodiments of the present disclosure provide a computer program product, including a computer program, wherein when the computer program is executed by a processor, the service instance scheduling method according to the first aspect and various possible designs of the first aspect is implemented.

The above description is merely illustrative of the preferred embodiments of the present disclosure and the technical principles used. Those skilled in the art should understand that the scope of disclosure involved in the present disclosure is not limited to the technical solutions formed by the specific combination of the above-mentioned technical features, but also should cover other technical solutions formed by any combination of the above-mentioned technical features or their equivalents without departing from the above-mentioned disclosure concept. For example, a technical solution formed by replacing the above-mentioned features with the technical features having similar functions disclosed in the present disclosure (but not limited to).

In addition, although the operations are described in a specific order, this should not be understood as requiring these operations to be performed in the specific order shown or in a sequential order. Under certain circumstances, multitasking and parallel processing may be advantageous. Similarly, although several specific implementation details are included in the above discussion, these should not be construed as limiting the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in a language specific to structural features and/or logical actions of the method, it should be understood that the subject matter defined in the appended claims is not necessarily limited to the specific features or actions described above. On the contrary, the specific features and actions described above are merely exemplary forms for implementing the claims.

The invention claimed is:

1. A service instance scheduling method, comprising:
    obtaining, based on a service mesh, microservice access data for a target service in a bypass mode, wherein the microservice access data represents access records of at least two upstream services of the target service with respect to a service instance of the target service;
    obtaining an evaluation indicator of at least one service instance corresponding to the target service according to the microservice access data, wherein the evaluation indicator represents a health degree of the service instance; and fusing the service instance according to the evaluation indicator of the service instance based on a current fusing amount corresponding to the target service being less than a preset threshold, wherein the fusing the service instance involves removing the service instance, wherein the obtaining, based on a service mesh, microservice access data for the target service in the bypass mode comprises:

obtaining, in the bypass mode, initial access data of the upstream services through the service mesh, wherein the initial access data represents access records for the target service, performing, through the service mesh, service discovery, accessing a first microservice component, and transmitting the initial access data to the first microservice component, and performing, by the first microservice component, a consistent hashing calculation on the initial access data to obtain the microservice access data.

2. The method according to claim 1, wherein performing, by the first microservice component, the consistent hashing calculation on the initial access data to obtain the microservice access data comprises:

obtaining, based on the initial access data, a microservice access indicator, wherein the microservice access indicator comprises a service name, a service cluster identifier, and an equipment room identifier of the target service;

performing a hash calculation according to the microservice access indicator to obtain a consistent hash key, wherein the consistent hash key is used for indicating a service instance; and generating the microservice access data according to the consistent hash key and a corresponding access record.

3. The method according to claim 1, wherein after obtaining, in the bypass mode, the microservice access data for the target service, the method further comprises:

storing the microservice access data into a second microservice component which is based on a time series database; and wherein obtaining the evaluation indicator of the at least one service instance corresponding to the target service according to the microservice access data comprises:

for each service instance corresponding to the target service, performing the following steps in sequence by the second microservice component:

obtaining target microservice access data corresponding to the target service instance; and generating the evaluation indicator of the target service instance based on the target microservice access data.

4. The method according to claim 3, wherein fusing the service instance according to the evaluation indicator of the service instance comprises:

fusing the target service instance when the evaluation indicator of the target service instance meets a first condition, wherein the first condition is a preset reference indicator used for identifying that the service instance is in an abnormal state.

5. The method according to claim 4, wherein the evaluation indicator comprises a total request amount and an error request amount of the service instance; and wherein fusing the target service instance when the evaluation indicator of the target service instance meets the first condition comprises:

obtaining the error request amount of the service instance when the total request amount of the service instance is greater than a first threshold;

obtaining the current fusing amount corresponding to the target service when the error request amount is greater than a second threshold; and fusing the service instance when the current fusing amount is less than a third threshold, wherein the third threshold is the preset threshold.

6. The method according to claim 1, further comprising:

obtaining, after the target service instance is fused, a fusing ratio of the target service, wherein the fusing ratio represents a ratio value of a service instance in a fused state to all service instances corresponding to the target service; and controlling, according to the fusing ratio, recovery processing on the service instance in the fused state.

7. The method according to claim 1, wherein fusing the service instance comprises: implementing fusion processing by controlling an instance weight to be zero; and the method further comprises:

recovering the target service instance after a preset duration, and increasing the instance weight of the target service instance in each recovery period based on a target multiplier in sequence until the instance weight reaches an initial weight; and/or, performing, by the service mesh, load balancing on each service instance of the target service based on the instance weight.

8. The method according to claim 7, further comprising:

recording an accumulated number of fusions of the target service instance; and setting the target service instance to a recoverable state according to the accumulated number of fusions when the accumulated number of fusions is less than a fourth threshold; and wherein recovering the target service instance comprises:

recovering the target service instance when the target service instance is in the recoverable state.

9. An electronic device, comprising:

at least a processor, and a non-transitory memory with instructions thereon, wherein the instructions upon execution by the processor, cause the processor to:

obtain, based on a service mesh, microservice access data for a target service in a bypass mode, wherein the microservice access data represents access records of at least two upstream services of the target service with respect to a service instance of the target service;

obtain an evaluation indicator of at least one service instance corresponding to the target service according to the microservice access data, wherein the evaluation indicator represents a health degree of the service instance; and fuse the service instance according to the evaluation indicator of the service instance based on a current fusing amount corresponding to the target service being less than a preset threshold, wherein fusing the service instance involves removing the service instance, wherein obtaining, based on a service mesh, microservice access data for the target service in the bypass mode comprises:

obtaining, in the bypass mode, initial access data of the upstream services through the service mesh, wherein the initial access data represents access records for the target service, performing, through the service mesh, service discovery, accessing a first microservice component, and transmitting the initial access data to the first microservice component, and performing, by the first microservice component, a consistent hashing calculation on the initial access data to obtain the microservice access data.

10. The electronic device according to claim 9, wherein the processer is further caused to:

obtain, based on the initial access data, a microservice access indicator, wherein the microservice access indicator comprises a service name, a service cluster identifier, and an equipment room identifier of the target service;

perform a hash calculation according to the microservice access indicator to obtain a consistent hash key, wherein the consistent hash key is used for indicating a service instance; and generate the microservice access data according to the consistent hash key and a corresponding access record.

11. The electronic device according to claim 9, wherein the processer is further caused to:

store the microservice access data into a second microservice component which is based on a time series database; and wherein the processer is further caused to:

for each service instance corresponding to the target service, perform the following steps in sequence by the second microservice component:

obtain target microservice access data corresponding to the target service instance; and generate the evaluation indicator of the target service instance based on the target microservice access data.

12. The electronic device according to claim 11, wherein the processer is further caused to:

fuse the target service instance when the evaluation indicator of the target service instance meets a first condition, wherein the first condition is a preset reference indicator used for identifying that the service instance is in an abnormal state.

13. The electronic device according to claim 12, wherein the evaluation indicator comprises a total request amount and an error request amount of the service instance; and wherein the processer is further caused to:

obtain the error request amount of the service instance when the total request amount of the service instance is greater than a first threshold;

obtain the current fusing amount corresponding to the target service when the error request amount is greater than a second threshold; and fuse the service instance when the current fusing amount is less than a third threshold, wherein the third threshold is the preset threshold.

14. The electronic device according to claim 9, wherein the processer is further caused to:

obtain, after the target service instance is fused, a fusing ratio of the target service, wherein the fusing ratio represents a ratio value of a service instance in a fused state to all service instances corresponding to the target service; and control, according to the fusing ratio, recovery processing on the service instance in the fused state.

15. The electronic device according to claim 9, wherein the processer is caused to: implement fusion processing by controlling an instance weight to be zero; and the processer is further caused to:

recover the target service instance after a preset duration, and increase the instance weight of the target service instance in each recovery period based on a target multiplier in sequence until the instance weight reaches an initial weight; and/or, perform, by the service mesh, load balancing on each service instance of the target service based on the instance weight.

16. A non-transitory computer-readable storage medium storing instructions that cause at least a processor to:

obtain, based on a service mesh, microservice access data for a target service in a bypass mode, wherein the microservice access data represents access records of at least two upstream services of the target service with respect to a service instance of the target service;

obtain an evaluation indicator of at least one service instance corresponding to the target service according to the microservice access data, wherein the evaluation indicator represents a health degree of the service instance; and fuse the service instance according to the evaluation indicator of the service instance based on a current fusing amount corresponding to the target service being less than a preset threshold, wherein fusing the service instance involves removing the service instance, wherein obtaining, based on a service mesh, microservice access data for the target service in the bypass mode comprises:

obtaining, in the bypass mode, initial access data of the upstream services through the service mesh, wherein the initial access data represents access records for the target service, performing, through the service mesh, service discovery, accessing a first microservice component, and transmitting the initial access data to the first microservice component, and performing, by the first microservice component, a consistent hashing calculation on the initial access data to obtain the microservice access data.

17. The non-transitory computer-readable storage medium according to claim 16, wherein the processer is further caused to:

obtain, based on the initial access data, a microservice access indicator, wherein the microservice access indicator comprises a service name, a service cluster identifier, and an equipment room identifier of the target service;

perform a hash calculation according to the microservice access indicator to obtain a consistent hash key, wherein the consistent hash key is used for indicating a service instance; and generate the microservice access data according to the consistent hash key and a corresponding access record.

\* \* \* \* \*